United States Patent [19]

Maurantonio

[11] Patent Number: 4,748,902
[45] Date of Patent: Jun. 7, 1988

[54] AUTOMATIC FOOD COOKER AND DISPENSER

[76] Inventor: Vito Maurantonio, 232 North Ave., Highwood, Ill. 60040

[21] Appl. No.: 5,582

[22] Filed: Jan. 21, 1987

[51] Int. Cl.[4] .................. A47J 27/00; A47J 37/12; A23L 3/00
[52] U.S. Cl. ..................... 99/326; 99/341; 99/357; 99/404; 99/407; 99/443 C
[58] Field of Search .............. 99/407, 404, 403, 357, 99/484, 443 C, 325, 326, 327, 341

[56] References Cited

U.S. PATENT DOCUMENTS

| | | | |
|---|---|---|---|
| 2,953,080 | 9/1960 | Gartover et al. | 99/357 X |
| 3,291,035 | 12/1966 | Ignelzi | 99/357 |
| 3,357,341 | 12/1967 | Kocken et al. | 99/407 X |
| 3,398,672 | 8/1968 | Hoeberigs | 99/407 |
| 3,443,509 | 5/1969 | Sandy | 99/357 |
| 3,448,677 | 6/1969 | Dexters | 99/357 X |
| 3,548,738 | 12/1970 | McDevitt et al. | 99/357 |
| 3,667,373 | 6/1972 | Sicher et al. | 99/407 |
| 3,685,432 | 8/1972 | Hoeberigs | 99/357 |
| 3,690,247 | 9/1972 | Van Cleven et al. | 99/357 X |
| 3,818,820 | 6/1974 | Harris et al. | 99/407 |
| 4,030,632 | 6/1977 | Harashima | 99/357 X |
| 4,359,935 | 11/1982 | Murray | 99/407 X |

*Primary Examiner*—H. Hampton Hunter
*Attorney, Agent, or Firm*—Wood, Dalton, Phillips, Mason & Rowe

[57] ABSTRACT

A hot foot dispenser including structure for storing foodstuffs at below-freezing temperatures, transferring a portion of the foodstuffs from the storage structure to a cooking tank, and delivering the cooked foodstuff portions from the cooking tank after completion of a rapid cooking thereof to a dispensing position. Different forms of conveyors are illustrated for transferring the foodstuff portions selectively from any one of a plurality of different storage elements containing different foodstuffs as selected by a customer. Structure is provided for maintaining the cooking fluid sanitary. Structure is provided for effecting an automatic transfer of the cooked foodstuff portions to the dispensing position as an incident of the reception of a food-receiving receptacle thereat. Air circulating structure is provided for flowing air through the apparatus and filtering the air before discharging the same to ambient atmosphere. The food container may permit manual selection thereof or automatic delivery to the dispensing position in different forms of the disclosed invention. A condiment dispenser is provided for providing condiments onto the prepared foodstuffs in the receptacle, as desired by the customer. An auger-type dispenser for transferring foodstuff portions to the transfer structure is also disclosed.

28 Claims, 2 Drawing Sheets

AUTOMATIC FOOD COOKER AND DISPENSER

TECHNICAL FIELD

This invention relates to vending apparatus, and in particular to a hot food cooking and dispensing apparatus.

BACKGROUND ART

A number of automatic dispensers have been developed for delivering edible and potable foodstuffs. Coin-operated soft drink and coffee dispensers are well known. Further, coin-operated dispensers for dispensing candy bars and other edible products are well known.

It is further known to effect the preparation of the foodstuff in the coin-operated automatic dispenser, such as for example, in the mixing of the drink ingrdients with hot water at the time of dispensing of coffee, hot chocolate, soups, and the like.

DISCLOSURE OF INVENTION

The present invention comprehends an improved automatic dispenser for providing hot edible food products wherein cooking of the products is effected as a part of the dispensing cycle.

The invention comprehends the provision of storage means for storing aplurality of different foodstuffs for selective cooking and dispensing as selected by the customer.

The dispensing apparatus includes refrigeration means for maintaining the stored foodstuffs refrigerated until use. In the illustrated embodiment, the refrigeration means comprises freezer means for maintaining the foodstuffs below 32° F. prior to the cooking and dispensing thereof.

The apparatus includes means for transferring a portion of the selected stored foodstuff to a cooking means wherein rapid cooking is effected.

In the illustrated embodiment, the cooking means includes a body of hot cooking liquid, such as cooking oil.

The means for transferring the selected foodstuff portion from the storage means to the cooking means may comprise a conveying means, such as a belt conveyor, a basket-type translatable conveyor, and the like.

Delivery means are provided for delivering the cooked foodstuff portion from the cooking means to a dispensing position.

The dispenser incudes means for providing a food receptacle at the dispensing position for receiving the cooked foodstuffs for subsequent consumption by the customer as desired.

In the illustrated embodiment, the cooking means maintains the cooking liquid at a temperature of approximately 385° F., whereby rapid thorough cooking of the foodstuff portion is effected.

The dispenser includes coin-operated control means for causing sequential operation of the transfer and delivering means for effecting the transfer, cooking and dispensing of the portion of the selected foodstuff stored in the storage means.

Where the transfer means comprises a conveyor belt having an associated plurality of pulleys, the pulleys are subjected to vapors from the cooking oil so as to permit the cooking oil vapors to lubricate the pulleys.

In the illustrated embodiment, the dispenser includes an outer cabinet having a window adjacent the cooking means, permitting observation of the cooking of the foodstuff portion therein by the customer.

The cabinet may be provided with dispensers for the food receptacles which, illustratively, may comprise cups, casserole dishes, etc.

The control means may include means responsive to the disposition of the food receptacle at the dispensing position to initiate a cycle of operation of the dispenser.

The transfer means, in the illustrated embodiment, includes auger means for delivering a portion of the foodstuffs stored in the storage means to the transfer conveyor.

In the illustrated embodiment, the cooking means comprises a tank for holding the hot liquid and means for replenishing the liquid in the tank for maintaining a preselected level of the cooking liquid therein.

The cooking means illustratively includes means for filtering the cooking liquid.

Means are provided for flowing air through the dispenser cabinet, including filter means for removing grease from the air prior to exhausting the air from the cabinet.

Means may be provided in the cabinet for automatically extinguishing a fire occurring within the cabinet.

Means may be provided in the cabinet for selectively dispensing condiments and the line onto the cooked foodstuff portion dispensed into the food receptacle at the dispensing position.

The condiment dispensing means may be mounted in the cabinet adjacent the dispensing position.

The cooking means, in the illustrated embodment, includes means for cyclically replacing the hot liquid in the cooking means.

The invention comprehends providing a plurality of food container dispensers mounted in the cabinet in side-by-side relationship adjacent the dispensing position.

The freezer means may comprise an automatic defrosttype freezer means for maintaining the foodstuffs effectively frostfree for facilitated cooking thereof with minimal spattering of the cooking liquid.

The cooking means may include means for selectively providing auxiliary heat to the hot liquid as an incident of heating demand.

Means may be provided for selectively discontinuing the heating of the hot liquid, such as during periods of nonuse such as overnight.

The invention comprehends providing the portions of the foodstuffs, in preselected configurations, permitting the rapid cooking by the high temperature cooking fluid.

The portions of the foodstuff cooked in the hot liquid are arranged so that thorough cooking of the entirety thereof occurs in the very short cooking time as a function of the configuration of the foodstuff portion and the temperature of the cooking liquid. It has been found that the foodstuffs prepared in this manner are properly and tastefully cooked, witht he short cooking time permitting maintained healthful characterisitcs of the foodstuffs.

The hot food dispenser of the present invention is extremely simple of construction while yet providing the highly desirable features discussed above.

BRIEF DESCRIPTION OF THE DRAWING

Other feature and advantages of the invention will be apparent from the following description taken in connection with the accompanying drawing wherein.

BEST MODE FOR CARRYING OUT THE INVENTION

Figure 1:
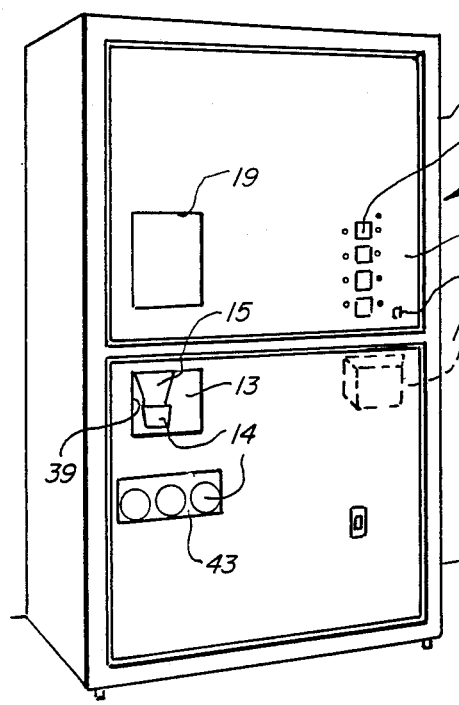
FIG. 1 is a front elevation of an automatic hot food storage, cooking, and dispensing apparatus embodying the invention.
Figure 2:
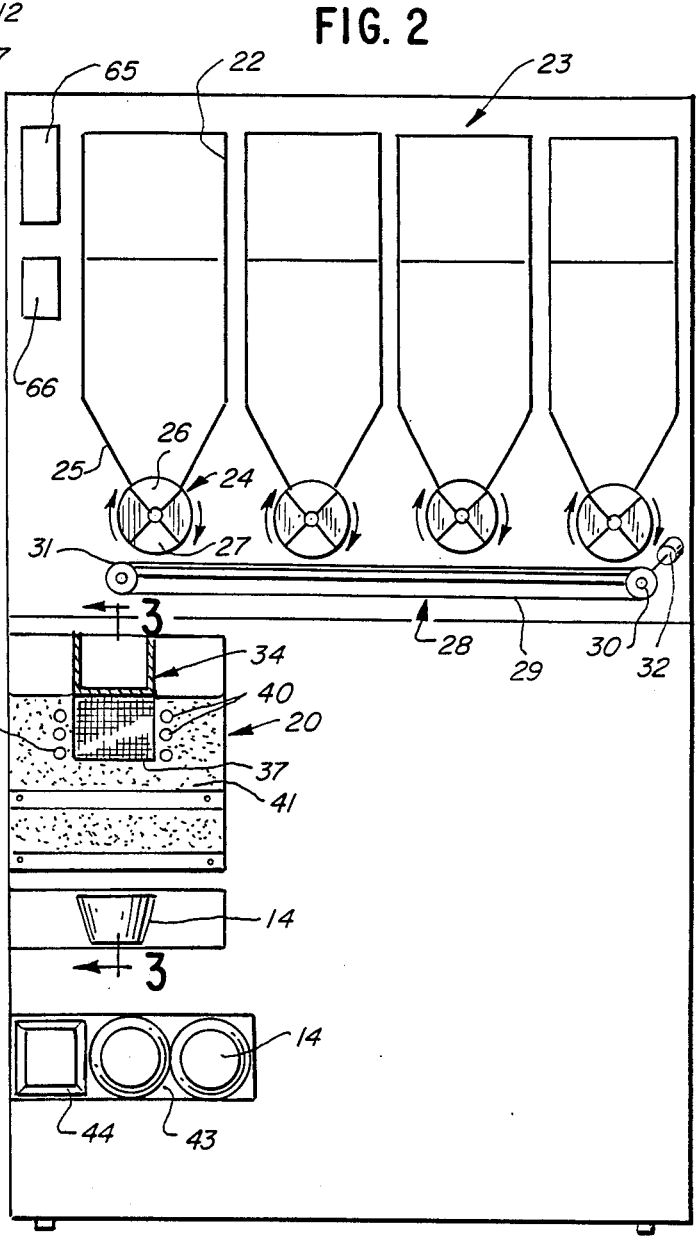
FIG. 2 is a schematic elevation illustrating functional components of the apparatus.
Figure 3:
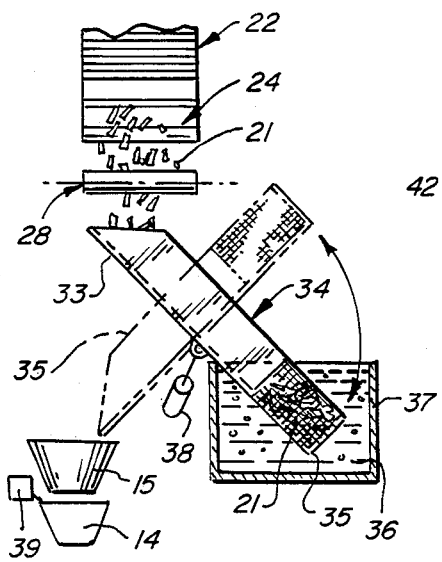
FIG. 3 is a fragmentary elevation illustrating, in greater detail, the means for transferring, cooking, and dispensing the cooked food portions.

In the illustrative embodiment of the invention as disclosed in FIGS. 1-3 of the drawing, an automatic food storage, cooking, and dispensing apparatus generally designated 10 is shown to comprise an outer cabinet 11 defining a front wall 12. A forwardly opening cavity defines a dispensing space 13 in a lower portion of the front wall wherein a food-receiving receptacle 14 may be temporarily retained by a customer for receiving cooked food from a dispensing chute 15 openign into the dispensing space.

Automatic operation of the apparatus may be effected by a conventional coin-operated control 16 mounted within the cabinet 11. A coin-receiving slot 17 is provided inthe front wall for receiving suitable coins to actuate the control mechanism 16 which, in turn, effects an automatic operation of the transfer, cooking, and dispensing mechanism of the apparatus. Suitable selector buttons 18 may be provided for selecting any one of a plurality of different types of foodstuffs as selected by the customer.

The front wall of the cabinet further defines a window 19 for viewing by the customer of cooking means generally designated 20 disposed within the cabinet rearwardly of the window.

More specifically, food portions generally designated 21 are selectively stored in a plurality of freezer bins 22 of a freezer storage means generally designated 23 provided in an upper portion of cabinet 11. In the illustrated embodiment, as seen in FIG. 2, four such storage bins are provided for selectively storing four different types of frozen food portions. The pushbusttom controls 18 define a corresponding plurality of selector buttons corresponding one each to the different bins.

Each storage bin is provided with a rotary dispensing closure 24 at the lower end of a lowermost tapered guide portion 25 of the bin. Each closure defines a pair of cavities 26 and 27, which, when opening upwardly into the bin, receives a corresponding portion of the food portions stored therein. Rotation of the closure 24, as illustrated in FIG. 2, so as to position the upwardly opening cavity to a downwardly opening disposition effects a transfer of the quantity of the stored food portions received therein from the bin 22 onto a subjacent conveyor generally designated 28.

Concurrently with the effecting of the rotation of the closure 24, control 16 effects operation of the conveyor 28, which, as shown in FIG. 2, comprises a conventional belt conveyor having a blet 29 entrained over a pair of pulleys 30 and 31. Pulley 30, as shown in FIG. 2, may be suitably driven by a drive motor 32 actuated by the control 16 to effect the desired transferring operation of the conveyor.

In the illustrated embodiment, the closures 24 include a pair of opposed cavities 26 whereby, when one cavity is repositioned to open downwardly and transfer food portions onto conveyor 28, the other cavity opens upwardly into the bin portion 25 to receive a subsequent quantity of food portions from the bin. Thus, at all times, the closure 24 is potentiated to deliver quickly a preselected quantity of food portions onto the transferring means conveyor 28 as an incident of selection thereof by the customer.

As shown in FIG. 3, conveyor 28 drops the selected food portions 21 into one end 33 of a transfer basket 34. The opposite end 35 of basket 34 is closed to define a cooking container 35 for retaining the transferred food portions 21 for immersion thereof in a body of cooking liquid, such as cooking oil 36 for a period of time sufficiently to effect thorough cooking of the food portions. By proper selection of the size and configuration of the cooking portions 21, the cooking of the food portions may be effected rapidly while the customer views the cooking operation through the window 19.

Illustratively, the cooking oil may be maintained at a temperature of approximately 385° F. to effect the desired rapid cooking, notwithstanding the provision of the food portions at a relatively low temperature below freezing, such as 0° F.

In the illustrated embodiment, the freezer structure 23 comprises a frostfree apparatus of suitable well-known construction, whereby moisture collection in the form of frost on the food particles is effectively avoided, thereby minimizing spattering of the cooking oil from frost on the food particles.

The body of cooking oil 36 may be retained in an upwardly opening tank 37. Vapors from the cooking oil may be utilized to lubricate the pulley 31 disposed superjacent the tank and vapors deposited on the conveyor belt 28, in turn, may be utilized to lubricate the pulley 30 for improved operation of the apparatus.

Upon completion of the cooking of the food portions 21, the transfer basket 34 is repositioned from the 4 o'clock position of FIG. 3 to the dotted, 2 o'clock dispensing position shown therein. Thus, the cooked food portions are guided by the basket 34 through the open end 35 into a subjacent container 14 positioned in dispensing space 13 subjacent the guide chute 15 by the customer.

As will be obvious to those skilled in the art, control of the positioning of basket 34 may be effected by a selectively rotatable motor 38 so as to effect selective positioning from the full line cooking disposition to the broken line dispensing disposition only as an incident of the container 14 actuating a sensor 39 in cavity 13, as a result of the customer placing the receptacle 14 appropriately under chute 15.

Thus, control 16 effects automatic selection of the desired foodstuff from the appropriate bin 22 of the freezer apparatus 23, automatic transfer of the selected foodstuff portion to the cooking means, and dispensing of the cooked food portion as an incident of the customer providing the receiving receptacle in the dispensing space.

For improved efficiency, the heating tank may be maintained at cooking temperature by a suitable heating coil 40 embedded in a body of insulation 41. A supplemental heating coil 42 may be provided for providing extra heating to the cooking oil in the even of high demand. Such heating coils may be effectively controlled by the control 16 in a conventional manne, as will be obvious to those skilled in the art.

In the illustrated embodiment, the receptacles 14 are removably received in a receptacle holder 43 subjacent the dispensing cavity 13 for facilitated access by the customer. As shown, the holder 43 may hold a plurality of stacks of such containers.

In the illustrated embodiment, the food receptacles are shown as cups. As will be obvious to those skilled in the art, other shapes of such containers may be utilized within the broad scope of the invention, including casserole dishes, shallow dishes, etc., commensurate with the type of food being dispensed. Similarly, the holder 43 may be arranged to provide food-receiving containers having different configurations where the different types of foodstuffs selectively dispensed would appropriately use such different shaped containers. Thus, illustratively, one group of containers in dispenser 43 may comprise casserole dish-type containers 44.

Figure 4:
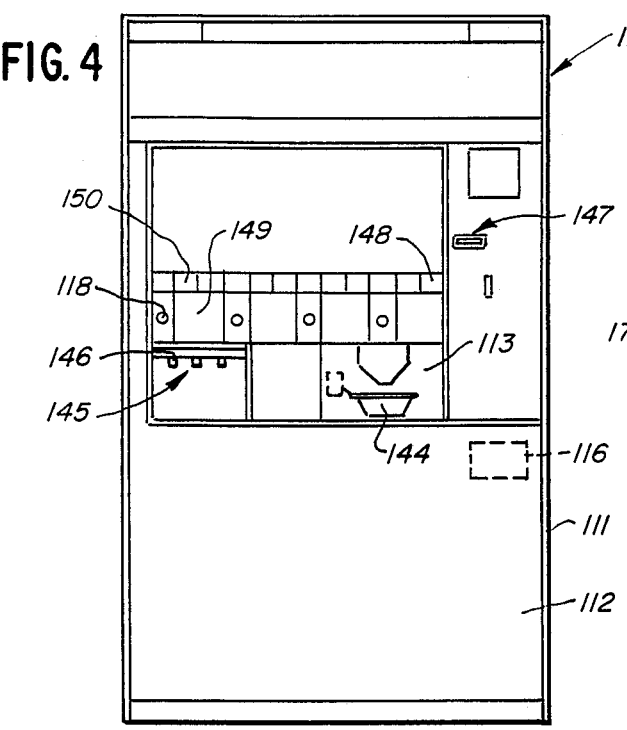
FIG. 4 is a front elevation of a modified form of apparatus embodying the invention.

Referring now to the embodiment of FIG. 4, a modified form of storage, cooking, and dispensing apparatus embodying the invention generally designated 110 is shown to comprise an apparatus generally similar to apparatus 10, but utilizing a number of modifications in different portions thereof.

More specifically, apparatus 110 includes a food storage portion generally designated 123 similar to food storage portion 23. The front wall 112 of the cabinet 111 thereof is arranged somewhat differently from the front wall 12 of cabinet 11 in that the viewing window is omitted. Similarly, the manually selectable container holder is omitted. A condiment dispenser 145 is provided for selectively delivering condiments onto the dispensed foodstuffs in the receptacle 144, as desired. In the illustrated embodiment, nozzles 146 for delivering different condiments, such as catsup, sauces, etc.

Apparatus 110 further includes an automatic bill changer generally designated 147. The apparatus may include a "sold out" indicator 148, indicating to the customer a sold out condition of any one of the different foodstuffs.

The food selector buttons 118 have associated therewith displays 149 showing a picture of the type of food to be selected by actuation of the associated button. Similarly, a price indicating display 150 is associated therewith.

Figure 5:
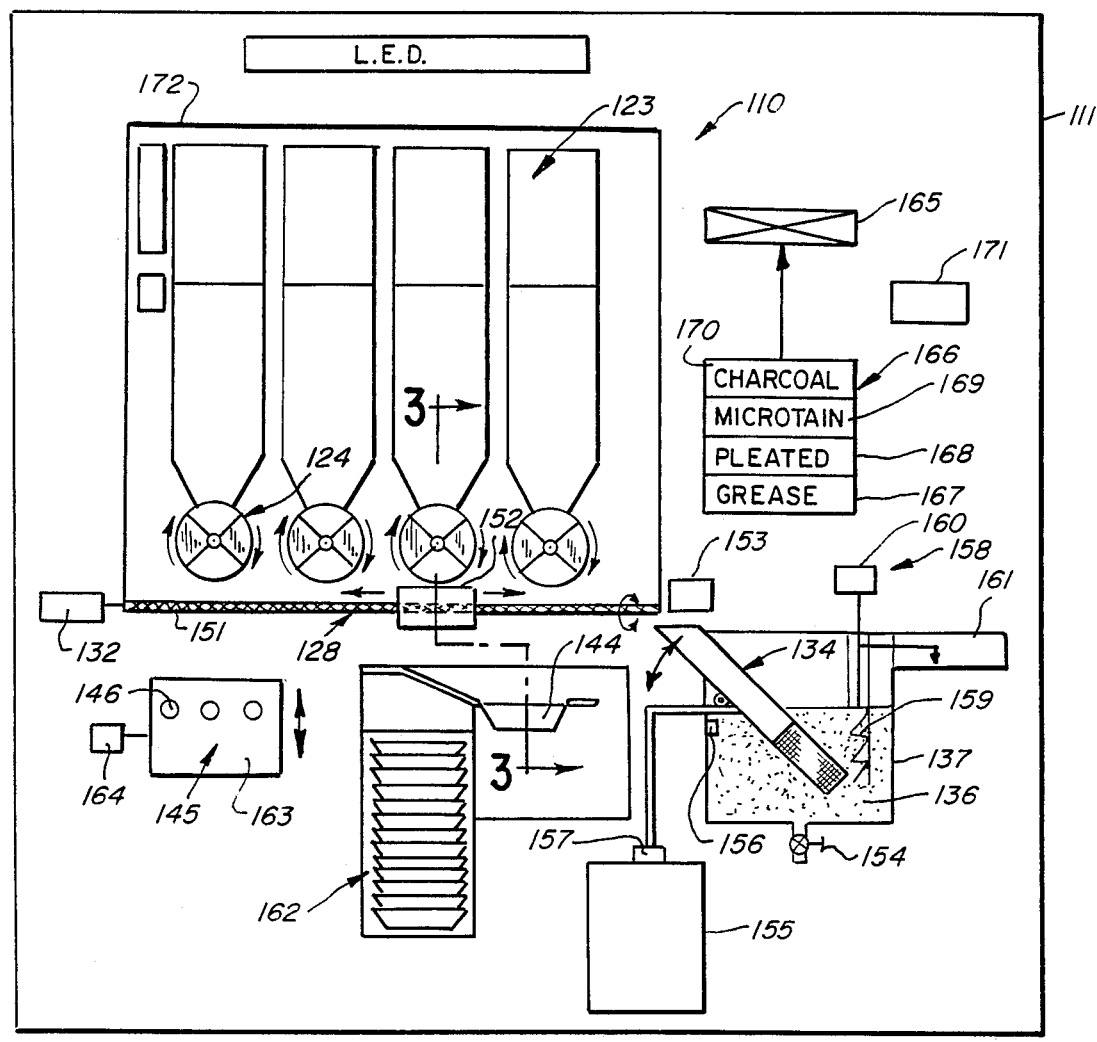
FIG. 5 is a schematic elevation illustrating the functional components of the apparatus of FIG. 4.

As shown in FIG. 5, the invention comprehends the use of any suitable form of transfer mechanism in addition to the belt conveyor 28 illustrated in connection with the apparatus 10. Thus, as shown in FIG. 5, a screw-type conveyor 128 includes a screw drive rod 151 and a traveling basket 152 which is caused to move horizontally along the length of the rod by rotation of the rod by means such as reversible drive motor 132. control 116 automatically positions the basket under the appropriate bin feed closure 124 to receive the foodstuff portion selected by the user. The basket is then automatically brought to the righthand end of the rod and suitable mechanism 153 engaged with the basket to effect a tipping thereof to discharge the transferred foodstuff portion into the transfer cooking basket 134.

As further illustrated in FIG. 5, the tank 137 is provided with a manually controlled drain 154. In the illustrated embodiment, the tank comprses a tank holding approximately 7 gallons of the cooking oil 136 and a replenishment tank 155 is provided holding approximately 5 gallons of cooking oil for replenishing the cooking automatically in the tank 137 by means of a sensor 156 connected to a pump 157 associated with the tank 155.

A filter system generally designated 158 is provided including a pump 159 driven by a motor 160, which recirculates the oil from tank 137 through a filter 161 so as to remove food particles, etc. from the cooking oil before recirculating the oil back to the tank 137.

Apparatus 110 includes an automatic dish dispenser generally designated 162 of conventional construction for selectively delivering one at a time of food-receiving dish 144 to the dispensing position 113. Concurrently with the delivery of the dish to the food dispensing position, the cooking basket 134 is repositioed in the same manner as cooking basket 34 of apparatus 10 to deliver the cooked foodstuff portion into the subjacent receptacle 144 in the dispensing position.

The condiment dispensr 145 may include a front closure door 163, which is selectively positioned by an operator 164 to provide access to the condiment dispenser only upon delivery of the prepared foodstuffs to the container 144. Thus, the control 164 may be include an automatic timer for closing the door 163, thereby providing controlled access to the condiment dispenser nozzles 146.

To minimize the amount of grease vapor within the cabinet, cabinets 10 and 110 may be provided with an air circulation means, including an exhaust fan 165, and an associated air filter 166, which may include a grease collecting portion 167, a pleated fiber filter 168, a microtain portion 169, and an activated charcoal portion 170 for successively treating the air before discharge from the cabinet through fan 165.

An automatically operable fire extinguisher 171, of conventional type, may be provided within the cabinet adjacent the cooking oil tank for extinguishing any flames which might occur because of failure of the heating means.

The freezer apparatus 123 may include a stainless steel insulated housing 172. As will be obvious to those skilled inthe art, other components of the food storage, transfer, and cooking means are preferably similarly formed of sanitary materia, such as stainless steel.

Each of the apparatuses 10 and 110 may include the air filter means, automatic oil filtration, and heating means as described above. Thus, elements of either of the two apparatuses which are similar are identified by similar reference numerals but 100 different. Unless otehrwise described, the components of the apparatuses, as identified, comprise components of conventional commercial construction and require no further description, as will be obvious to those skilled in the art.

It has been found that the automatic vending apparatus of the invention is adapted for use in providing a wide range of different foodstuffs. Illustratively, the apparatus may be utilized for vending french fries, chicken nuggets, onion rings, cheese balls, steak strips, breaded mushrooms, breaded zucchini, pizza puffs, eggrolls, potato puffs, sausage links, ravioli, seafood puffs, breaded shrimp, breaded scallops, hugh puppies, breaded cauliflower, breaded pepper strips, etc., as well as ethnic foods, such as burritos, taco puffs, nachos, pillow tacos, breaded okra, etc. It has been found that a wide range of such foodstuffs may be prepared quickly and cooked thoroughly, notwithstanding the frozen condition thereof as delivered from the storage means. By maintaining the cooking fluid at a preselected high temperature and sanitary at all times, highly tasteful and healthful foodstuff preparation is effected. The selection of the particular foodstuffs may be made by the operator of the apparatus commensurate with the desires of the particular customers.

Where the apparatus is installed in locations under intermittent use conditions, such as conditions wherein the apparatus would not be used overnight, the control may include means for discontinuing the heating of the cooking fluid for preselected times, thereby extending the useful life of the cooking fluid. By providing the heating means externally of the tank, the improved uniform heating of the oil is effected without charring the same.

Figure 6:
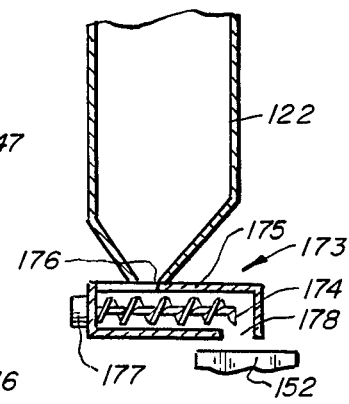
FIG. 6 is a fragmentary elevation partially in section illustrating an auger-type conveyor for use in the apparatus of FIG. 4.

As shown in FIG. 6, in lieu of the rotary transfer closures 24, an auger-type mechanism generally designated 173 may be utilized wherein an auger 174 is enclosed within a housing 175 having an openign 176 at the lower end of the storge bin 122. The auger is selectively rotated by a drive motor 177 so as to transfer foodstuff from bin 122 to a discharge openign 178 to the subjacent basket 152 when properly located below the opening.

The foregoing disclosure of specific embodiments is illustrative of the broad inventive concepts comprehended by the invention.

I claim:

1. A hot food dispenser comprising:
    storage means for storing a plurality of different foodstuffs at a temperature below 32° F. and substantially free of surface water;
    cooking means having a body of hot cooking oil at a preselected temperature above 212° F. for rapidly cooking said foodstuffs;
    transfer means for selectively delivering a portion of any one of the different foodstuffs from said storage means and into said ot oil for effecting cooking thereof during a preselected period of cooking time;
    delivery means for delivering the cooked foodstuff portion to a dispensing position; and
    coin-operated controlmeans for cuasing sequential operation of said transfer and delivery means for effecting a transfer, cooking, and dispensing of a portion of a selected foodstuff stored in said storage means.

2. The hot food dispenser of claim 1 wherein said cooking means comprises means for heating said foodstuff portion to approximately 385° F.

3. The hot food dispenser of claim 1 wherein said transfer means comprises conveyor belt means.

4. The hot food dispenser of claim 1 wherein said transfer means comprises conveyor belt means having a plurality of pulleys, and said cooking means liquid comprises hot cooking oil, said hot cooking oil further defining means for providing oily vapor lubricating said pulleys.

5. The hot food dispenser of claim 1 wherein said dispenser includes an outer cabinet having a window adjacent said cooking means maintained substantially free of spattering to permit continued observation of the cooking of the foodstuff portions selectively therein.

6. The hot food dispenser of claim 1 wherein said dispenser includes an outer cabinet having a foodstuff holder dispenser mounted therein immediately adjacent said dispensing position.

7. The hot food dispenser of claim 1 wherein said dispenser includes an outer cabinet having a foodstuff holder dispenser mounted therein, said control means includes means responsive to placement of a foodstuff holder at said dispensing position to initiate a cycle of operation of the dispenser.

8. The hot food dispenser of claim 1 wherein said transfer means comprises a conveyor, and auger means for delivering a portion of the foodstuffs from the storage means to said conveyor.

9. The hot food dispenser of claim 1 wherein said transfer means comprises a conveyor, and auger means for delivering a portion of the foodstuffs from the storage means to said conveyor, said conveyor comprising a screw rod defining an axis of rotation, and a traveling basket for receiving the foodstuff portion from the storage means and transferring it to the cooking means as an incident of rotation of said screw rod about said axis.

10. The hot food dispenser of claim 1 wherein said dispenser includes an outer cabinet having a dish dispenser mounted therein.

11. The hot food dispenser of claim 1 wherein said dispenser includes an outer cabinet having a dish dispenser mounted therein immediately adjacent said dispensing position.

12. The hot food dispenser of claim 1 wherein said cooking means comprises a tank for holding said hot oil, and means for replenishing the oil in said tank for maintaining a preselected level of liquid therein.

13. The hot food dispenser of claim 1 wherein said means includes means for filtering particulate material from the liquid.

14. The hot food dispenser of claim 1 wherein said dispenser includes an outer cabinet and means for flowing air through the cabinet including filter means for removing grease from the air prior to exhausting the air from the cabinet.

15. The hot food dispenser of claim 1 wherien said dispenser iludes an outer cabinet and means in said cabinet for automatically extinguishing a fire occurring within said cabinet.

16. The hot food dispenser of claim 1 wherein said dispenser includes an outer cabinet having a food receptacle dispenser mounted therein, and means mounted in said cabinet for selectively dispensing condiments and the like onto the cooked foodstuff portion dispensed into a food receptacle at said dispensing position.

17. The hot food dispenser of claim 1 wherein said dispenser includes an outer cabinet having a food receptacle dispenser mounted therein, and means mounted in said cabinet adjacent said dispensing position for selectively dispensing condiments and the like onto the cooked foodstuff portion dispensed into a food receptacle at said dispensing position.

18. The hot food dispenser of claim 17 wherein said cooking means icldues means for cyclically replacing the oil in said cooking means.

19. The hot food dispenser of claim 1 wherein said dispenser includes an outer cabinet having a plurality of food container dispenser mounted therein in side-by-side relationship.

20. The hot food dispenser of claim 1 wherein said dispenser includes an outer cabinet defining a front wall having a window therein permitting observation of the cooking of the foodstuff portion therein.

21. The hot food dispenser of claim 1 wherein said refrigerating means maintains said foodstuffs at a temperature of approximately 0° F.

22. The hot food dispenser of claim 1 wherein said dispenser includes an outer cabinet and means for preventing discharge of vaporized oil from the cabinet.

23. The hot food dispenser of claim 1 wherein said cooking means includes means for selectively providing auxiliary heat to said hot oil as an incident of a heavy demand for dispensing of the cooked foodstuffs.

24. The hod food dispenser of claim 1 wherein said cooking means includes means for selectively providing auxiliary heat to said hot oil as an incident of a heavy demand for dispensing of the cooked foodstuffs and means for selectively discontinuing the heating of the hot oil.

25. The hot food dispenser of claim 1 wherein said cooking means includes a tank and means externally of the tank for heating the cooking oil therein.

26. A hot food dispenser comprising:

storage and refrigeration means for storing a plurality of different foodstuffs substantially free of surface water;

cooking means having a body of hot cooking oil at a temperature of over 212° F. for rapidly cooking said foodstuffs;

transfer means for selectively delivering a portion of any one of the different foodstuffs from said storage means and into said hot oil for effecting cooking thereof;

means for removing foreign material from the hot oil transferred thereto by said foodstuffs including means for circulating the oil in said cooking means;

delivery means for delivering the cooked foodstuff portion to a dispensing position; and coin-operated controlmeans for causing sequential operation of said transfer and delivery means for effecting a transfer, cooking, and dispensing of selected portions of any of said foodstuffs stored in said storage means.

27. The hot food dispenser of claim 26 wherein said refrigeration means comprises means for maintaining said foodstuffs at a temperature below 32° F.

28. The hot food dispenser of claim 27 wherein said means for removing foreign material from the hot oil comprises means for circulating the oil in said cooking means.

* * * * *